US010373392B2

(12) United States Patent
Christen et al.

(10) Patent No.: US 10,373,392 B2
(45) Date of Patent: Aug. 6, 2019

(54) TRANSITIONING VIEWS OF A VIRTUAL MODEL

(71) Applicant: MICROSOFT TECHNOLOGY LICENSING, LLC, Redmond, WA (US)

(72) Inventors: Jonathan R. Christen, Bothell, WA (US); Robert Courtney Memmott, Woodinville, WA (US); Benjamin John Sugden, Redmond, WA (US); James L. Nance, Kirkland, WA (US); Marcus Tanner, Redmond, WA (US); Daniel Joseph McCulloch, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 76 days.

(21) Appl. No.: 14/836,818

(22) Filed: Aug. 26, 2015

(65) Prior Publication Data
US 2017/0061702 A1   Mar. 2, 2017

(51) Int. Cl.
*G06F 3/01* (2006.01)
*G06T 19/20* (2011.01)
(Continued)

(52) U.S. Cl.
CPC ............ *G06T 19/20* (2013.01); *G02B 27/017* (2013.01); *G06F 3/012* (2013.01); *G06F 3/013* (2013.01);
(Continued)

(58) Field of Classification Search
CPC ......... G06T 19/20; G06T 3/40; G06T 7/0042; G06T 7/20; G06T 13/20; G06T 19/006;
(Continued)

(56) References Cited

U.S. PATENT DOCUMENTS 5,068,735 A * 11/1991 Tuchiya ............... F16M 11/18
   348/211.9
7,753,785 B2 * 7/2010 Nishimura ............ A63F 13/10
   345/418

(Continued)

OTHER PUBLICATIONS

Inkling, "Scaling/Zooming Slows Down", pulished Apr. 7, 2014. https://forums.creativecow.net/docs/forums/post.php?forumid=2&postid=552314&univpostid=552314&pview=t&archive=T.*

(Continued)

*Primary Examiner* — Chong Wu
(74) *Attorney, Agent, or Firm* — Alleman Hall Creasman & Tuttle LLP

(57) ABSTRACT

Embodiments are disclosed for transitioning views presented via a head-mounted display device. One example method for operating a head-mounted display device includes displaying a virtual model at a first position in a coordinate frame of the head-mounted display device, receiving sensor data from one or more sensors of the head-mounted display device, and determining a line of sight of the user that intersects the virtual model to identify a location the user is viewing. The example method further includes, responsive to a trigger, moving the virtual model to a second position in the coordinate frame of the head-mounted display device corresponding to the location the user is viewing and simultaneously scaling the virtual model.

19 Claims, 6 Drawing Sheets

(51) Int. Cl.
  *G06T 7/20* (2017.01)
  *G02B 27/01* (2006.01)
  *G06T 7/73* (2017.01)

(52) U.S. Cl.
  CPC .................. *G06T 7/20* (2013.01); *G06T 7/73* (2017.01); *G02B 2027/014* (2013.01); *G02B 2027/0138* (2013.01); *G02B 2027/0178* (2013.01); *G06T 2219/2016* (2013.01)

(58) Field of Classification Search
  CPC .............. G06T 2200/04; G02B 27/017; G02B 2027/0178; G06F 3/011; G06F 3/012; G06F 3/013; G06F 3/017; G06K 9/0061
  See application file for complete search history.

(56) References Cited

U.S. PATENT DOCUMENTS

| | | | |
|---|---|---|---|
| 8,520,872 B2 | 8/2013 | Jang et al. | |
| 8,687,021 B2 | 4/2014 | Bathiche et al. | |
| 8,825,187 B1 | 9/2014 | Hamrick et al. | |
| 2004/0008181 A1* | 1/2004 | Saylor | G02B 21/365 345/156 |
| 2010/0208033 A1 | 8/2010 | Edge et al. | |
| 2013/0050258 A1* | 2/2013 | Liu | G06F 3/005 345/633 |
| 2013/0117377 A1 | 5/2013 | Miller | |
| 2013/0135316 A1* | 5/2013 | Choy | G06T 13/20 345/474 |
| 2014/0126724 A1 | 5/2014 | Kurabayashi et al. | |
| 2014/0168261 A1 | 6/2014 | Margolis et al. | |
| 2014/0186002 A1* | 7/2014 | Hanaya | G06F 3/011 386/200 |
| 2014/0240351 A1 | 8/2014 | Scavezze et al. | |

OTHER PUBLICATIONS

Woollaston, Victoria, "The 3D Virtual Reality Headgear That Means You Could Be Strolling Around the Pyramids From the Comfort of Your Home (As Long As You Don't Mind Looking Like a Bit of an Idiot)", Published on: Jun. 19, 2013, Available at: http://www.dailymail.co.uk/sciencetech/article-2344489/The-3D-virtual-reality-headgear-projects-digital-image-real-life-environments.html.

Nambiar, et al., "Spatialized Audio for Mixed Reality Theater: The Egyptian Oracle", In Proceedings of 18th International Conference on Auditory Display, Jun. 18, 2012, 4 pages.

Branscombe, Mary, "Microsoft Hololens Where 3d Meets the Real World", Retrieved on: May 25, 2015, Available at: http://www.in.techradar.com/reviews/wearables/Microsoft-HoloLens/articleshow/45992974.cms.

Gownder, J P, "Microsoft HoloLens Is a World-Changing Mixed Reality Product", Published on: Jan. 21, 2015, Available at: http://blogs.forrester.com/jp_gownder/15-01-21-microsoft_hololens_is_a_world_changing_mixed_reality_product.

Grasset, et al., "Moving Between Contexts—A User Evaluation of a Transitional Interface", In Proceedings of 18th International Conference on Artificial Reality and Telexistence, Dec. 1, 2008, pp. 137-143.

Kang, et al., "Kids in Fairytales: Experiential and Interactive Storytelling in Children's Libraries", In Proceedings of the 33rd Annual ACM Conference Extended Abstracts on Human Factors in Computing Systems, Apr. 18, 2015, pp. 1007-1012.

Grasset, et al., "Navigation Techniques in Augmented and Mixed Reality: Crossing the Virtuality Continuum", In Handbook of Augmented Reality, Jul. 13, 2011, 30 pages.

* cited by examiner

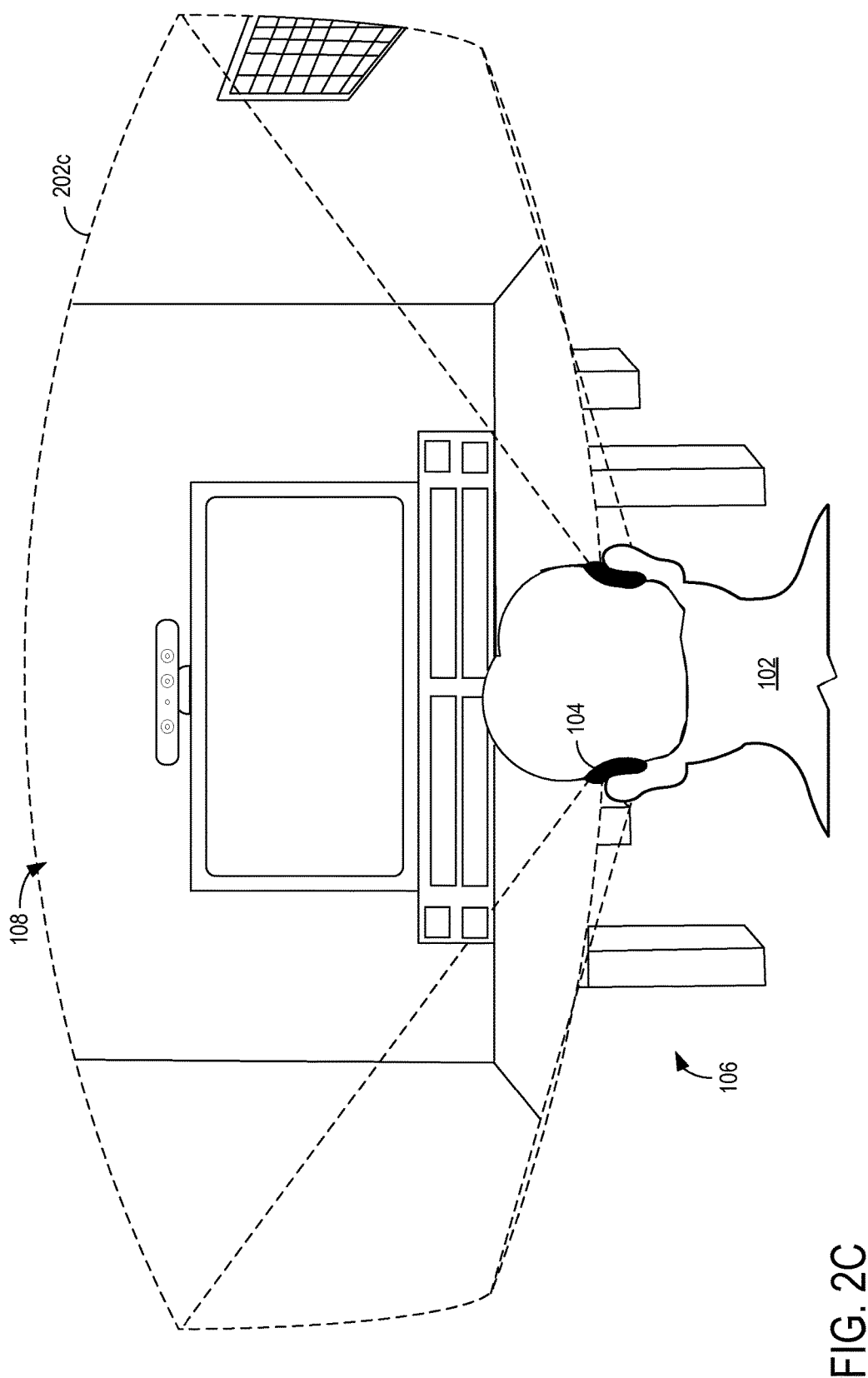

TRANSITIONING VIEWS OF A VIRTUAL MODEL

BACKGROUND

A head-mounted display device may be utilized to present virtual content via a near-eye display incorporated into the device. Some head-mounted display devices may be configured to present augmented reality experiences in which displayed virtual objects are mixed with a view of a real-world environment.

SUMMARY

Examples are disclosed for transitioning views presented via a head-mounted display device. One example provides a method for operating a head-mounted display device. The method includes displaying a virtual model at a first position in a coordinate frame of the head-mounted display device, receiving sensor data from one or more sensors of the head-mounted display device, and determining a line of sight of the user that intersects the virtual model to identify a location the user is viewing. The example method further includes, responsive to a trigger, moving the virtual model to a second position in the coordinate frame of the head-mounted display device corresponding to the location the user is viewing and simultaneously scaling the virtual model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A-2C show example transitions of views of a virtual model displayed via a head-mounted display device.

DETAILED DESCRIPTION

As mentioned above, a head-mounted display (HMD) device may display mixed or augmented reality images in which virtual objects (e.g., holograms) are mixed with the real-world in a way that makes the virtual objects feel a part of the user's real-world environment. Augmented reality images may be presented to occupy a small part of a user's field of view, or to effectively obscure much of a user's view of the real-world background by presenting a virtual reality image.

For example, as described in more detail below, virtual objects such as models of buildings, rooms, and other larger scale models may be presented via an augmented reality display device in a third-person or overhead view and/or at a reduced scale to allow a user to view the entire model. If a user wishes to view a portion of the model at an enlarged scale, such as at an actual life-sized scale from a first-person perspective within the model, the augmented reality device may be configured to change views from the smaller scale view to the larger scale view. However, changing the viewing frustum when transitioning from mixed reality to virtual reality, especially over large angles, scales, or distances, may be disorienting and jarring to a user.

Accordingly, examples are disclosed herein that relate to transitioning between perspective views and first person views in an augmented reality system in manners that may help to mitigate the risk of user discomfort or disorientation. Briefly, a virtual model may be moved and/or scaled between different views according to a non-linear progression in order to provide a smooth and consistent transition between perspectives of the virtual model. As examples of other effects, audio relating to the virtual model may fade in/out (e.g., change in volume) during transition (e.g., during movement/scaling) and/or may be adjusted to appear as if the origin of the sound moves with the model (e.g. by adjusting the output of speakers on the HMD device during the movement of the model). Also, the displayed image of the model may at least partially fade in/out during transition.

Figure 1:
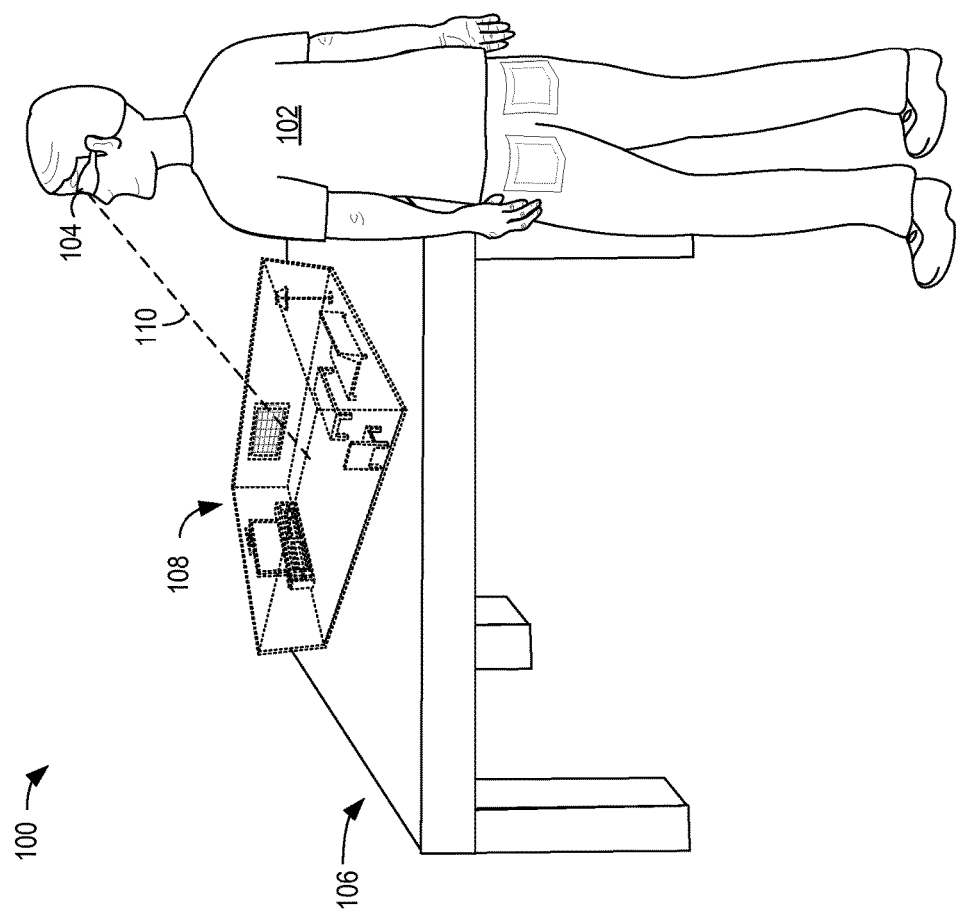
FIG. 1 shows an example use environment for an example head-mounted display device.

FIG. 1 shows an example use environment 100 in which a user 102 is wearing a HMD device 104, such that the user can view the real-world environment mixed with virtual imagery. Displayed virtual objects may appear to have various relationships to the real-world. For example, displayed virtual objects may be displayed as fixed on a surface of a real-world object, as floating a distance from a real-world object, or otherwise be logically tethered to a real-world location. In FIG. 1, a table 106 is in front of the user in the real-world environment, and a virtual model 108 is displayed as positioned on the table 106. In this view, as the user 102 moves around the table 106, the user may view the virtual model 108 from different perspectives, as if the virtual model 108 were physically located on the table top surface.

Figure 2A:
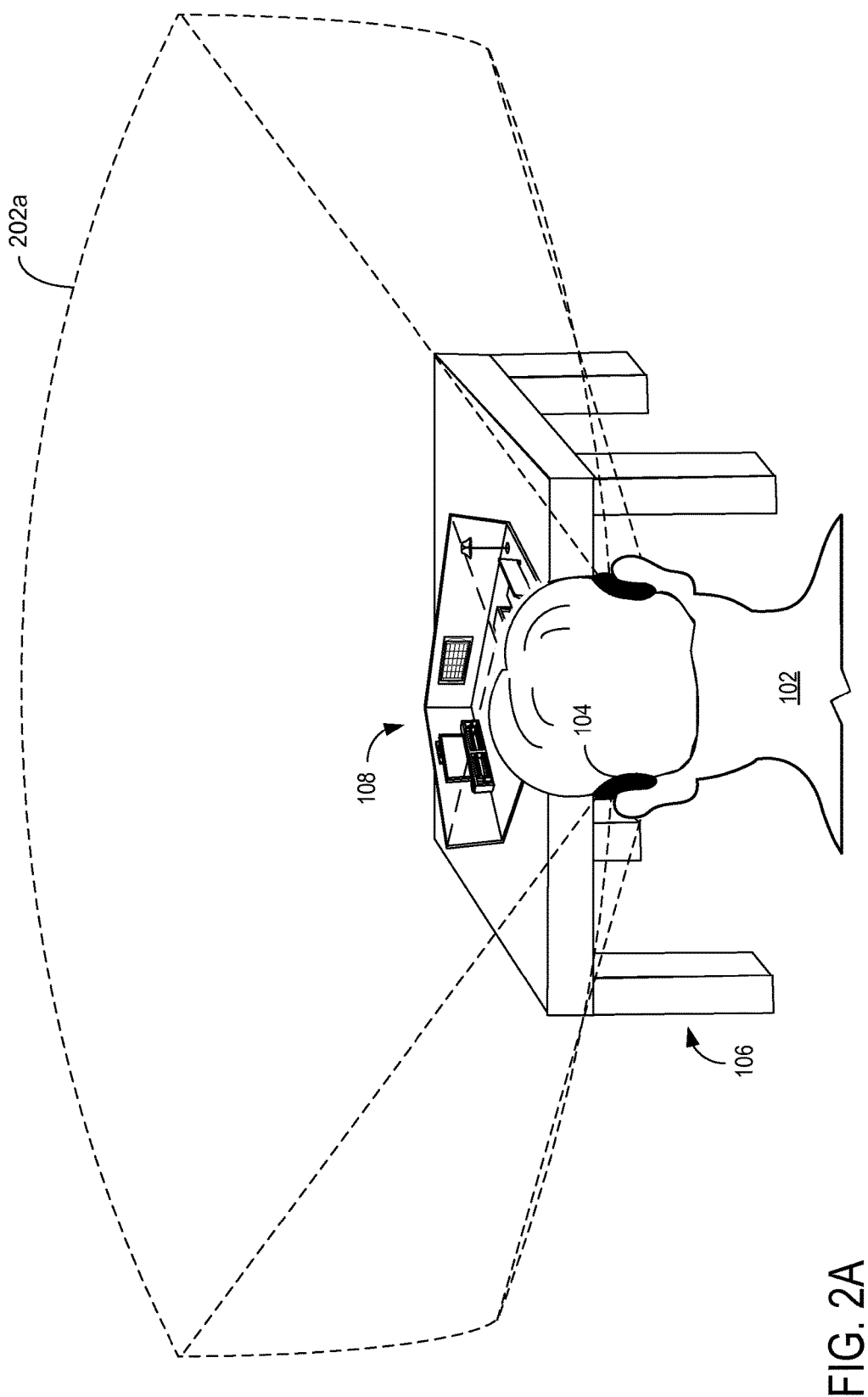

The depicted virtual model is a model of a room with furniture and other objects. A first view 202a of the virtual model is illustrated in FIG. 2A, wherein the view 202a is an overhead, third-person, "zoomed out" view from the user's perspective. In this view, the objects within virtual model 108 are much smaller than their real-world counterparts, such that a representation of an entire room is sized to fit on the top of table 106. Further, the HMD device 104 may include instructions executable to present the virtual model 108 at a different scale and/or from a different perspective, such as from a life-sized, first person perspective. As such, the HMD device may transition the model from the illustrated mixed or augmented reality configuration to a more immersive perspective, such as a virtual reality perspective, in which the user is presented a first-person view inside of the virtual model 108. It is to be understood that the virtual model 108 is provided for illustrative purposes, and any virtual object may be presented and transitioned as described.

In order to transition between these different scales in a manner that provides a smooth and comfortable user experience, the model may be moved (translationally and/or rotationally) and scaled simultaneously, and the simultaneous scaling and movement may be presented as an animated image to the user. Further, the scaling and movement may be performed at a variable rate progression, such that the rate of scaling and movement changes throughout the animated progression. As the scale changes, relative changes in scale that occur at a same rate may actually appear to occur at different rates. Thus, by performing one or more of the movement and the scaling at a variable rate progression, the rate can be adjusted to make the transition appear to occur at a consistent rate. For example, the virtual model may scale and/or move more quickly while the virtual model is smaller, and more slowly as the virtual model grows larger. Further, "slow takeoff" and "slow landing" effects, or other rate changes at either end of the transition, may be used to make the beginning and end of the transition between views appear to occur smoothly. Any suitable rate adjustment may be applied. As one non-limiting example, an exponential rate of scaling change may be used. Further, the rate adjustment applied to the scaling and the movement may be the same or different.

The view to which the presentation is transitioned may be selected based upon a location at which an estimated line of sight 110 of the user (e.g., as determined via head pose, gaze tracking, or other suitable method) intersects the virtual model 108. In other examples, the view and/or location to which the presentation transitions may be selected in another suitable manner, such as by a pointing gesture input or by the use of a displayed cursor controlled by a pointing device (e.g., a touch pad, mouse, etc.). In FIG. 1, the user's line of sight intersects the floor of the model room between a table and a television. Thus, the view may transition from that of FIG. 2A to a first-person perspective at this location of intersection.

Figure 2B:
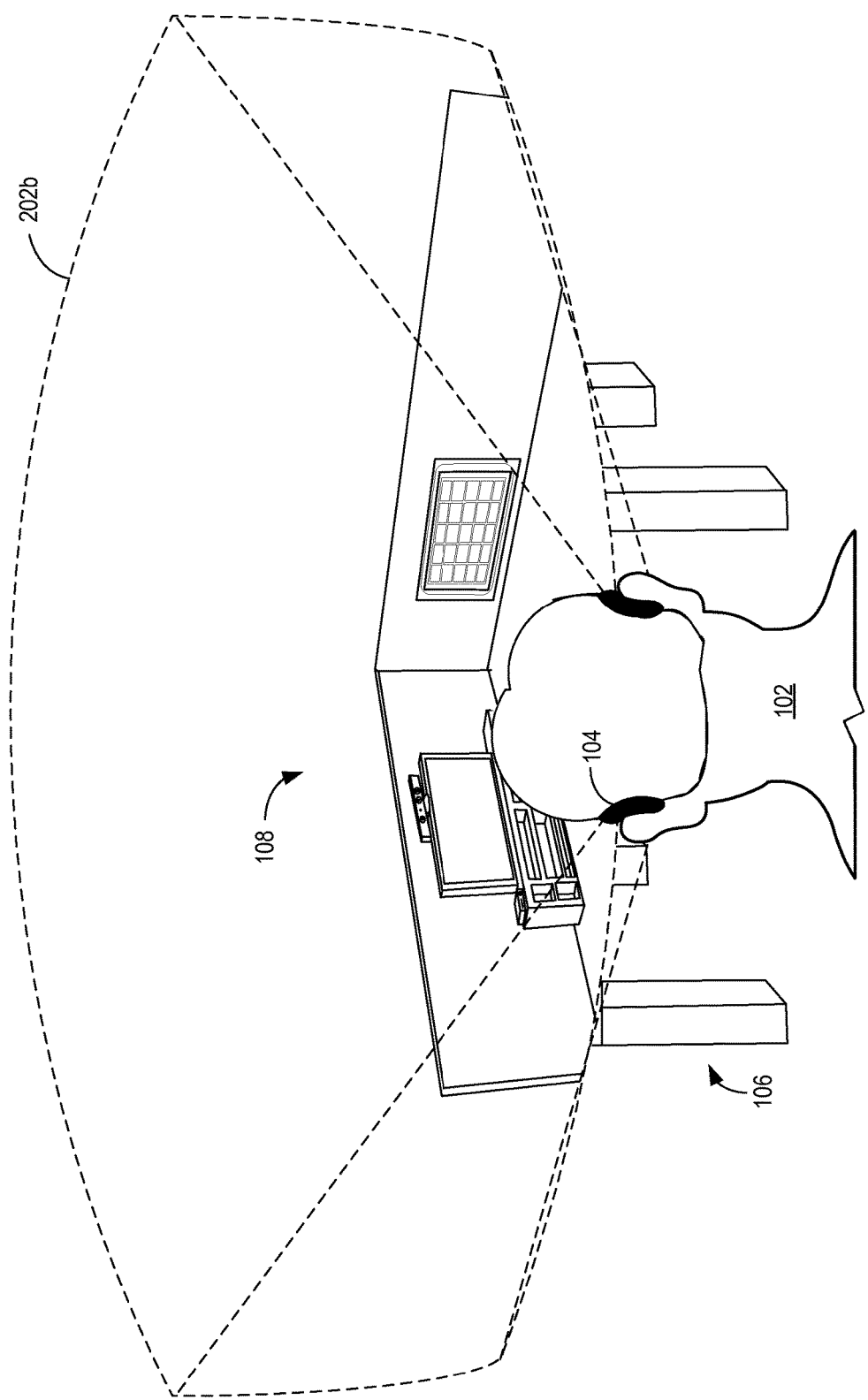

The transition from this view to a first-person, life-sized view is shown in FIGS. 2B-2C. First, FIG. 2B shows a view midway through moving and scaling the virtual model. As compared to the presentation of the virtual model 108 in view 202a of FIG. 2A, the virtual model 108 in view 202b of FIG. 2B has been scaled to occupy a larger area within the use environment, and moved to bring the floor of the virtual model 108 toward the feet of the user 102. As described in more detail below, the pose of the virtual model 108 may be maintained such that a point at which the user is viewing is maintained within a central region of the user's line of sight. As the virtual model 108 has been moved toward the user, elements in the room of virtual model 108 that are behind the user's line of sight 110 are no longer viewable in the presented model. Also, one or more of the movement and scaling of the virtual model 108 may be performed with a variable rate progression, as described above.

FIG. 2C shows the perspective of the user once the transition has been completed to the first-person virtual reality view 202c of the model. In contrast with views 202a and 202b of FIGS. 2A and 2B, respectively, the view 202c is much larger, and may be life-size or even larger. The view 202c of the model is positioned to represent a view from within the model from the user's height at a location corresponding to the intersection of the user's line of sight with the virtual model. In some examples, a bottom surface of the virtual model at the line of sight intersection may be moved to a location of the user's feet (e.g., as estimated based on head pose data and/or a user profile including a height of the user). Further, the first-person virtual reality view of the virtual model 108 is expanded to fill the user's view through the HMD device 104, occluding physical objects in the real-world environment of the user as viewed through the HMD device. Again, the transition from view 202b to 202c may be presented via an animation showing the movement and scaling as occurring at a variable rate progression. In order to prevent disorientation after the translation and/or scaling of the virtual model, the model may be positioned/oriented such that the user's line of sight is directed to the substantially the same location throughout the transition (e.g., the transition from the view shown in FIG. 2A to the view shown in FIG. 2C). For example, if the user's line of sight is directed to the television in the virtual model 108 at the start of the transition, the virtual model may be scaled and translated such that the television remains approximately central to the user's line of sight during the movement/scaling.

Figure 3:
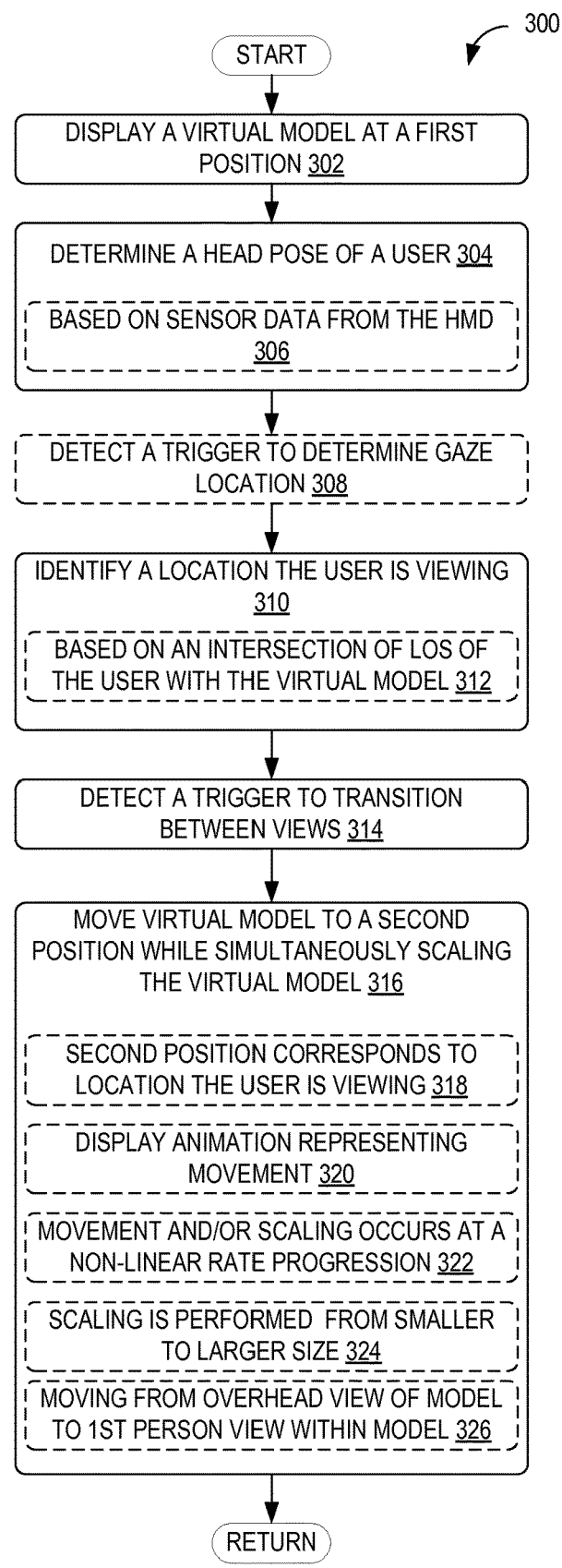
FIG. 3 is a flow chart showing an example method of operating a head-mounted display device to transition views of a virtual model.

FIG. 3 shows a flow diagram depicting an example method 300 of operating a head-mounted display device (e.g., HMD device 104 of FIGS. 1-2C) to transition a view of a virtual model in an augmented reality display environment. At 302, the method includes displaying a virtual model at a first position. The first position may correspond to a "zoomed out" overhead perspective view, as shown in FIGS. 1-2A, or may correspond to any other suitable view. At 304, the method includes determining a head pose of a wearer of the HMD device. As indicated at 306, the head pose may be based on sensor data from the HMD, such as image sensor data, inertial sensor data, and any other suitable sensor data. Example sensors for an HMD device are described in more detail below with regard to FIG. 4.

Continuing with FIG. 3, at 308, the method may optionally include detecting a trigger to determine a location at which a user gaze intersects a displayed virtual model. The trigger may be any suitable input or event received at a sensor and/or interface of the HMD device. Example of triggers include, but are not limited to, actuation of a mechanical input device, actuation of a touch sensor, a voice command, a gesture command detected by a motion sensor or image sensor (e.g., body part gesture, eye gesture, head gesture, etc.), and a control signal received from a logic device (e.g., a processor) of the HMD device that indicates a program-triggered transition. In other examples, the gaze location may be determined continuously, rather than when triggered.

The method further includes identifying a location the user is viewing at 310. The location may be determined based on an intersection of an identified line of sight of the user with the displayed virtual model, as indicated at 312, or based upon any other suitable user input. The line of sight of the user may be determined via any suitable mechanism, such as by tracking a user's eyes or head pose, and projecting an estimated gaze line (e.g., ray) toward the model based upon the eye or head pose.

At 314, the method includes detecting a trigger to transition between views. The trigger may be the same or different from the trigger optionally detected at 308. In response to detecting the trigger, the method proceeds to 316 to move the virtual model to a second position while simultaneously scaling the virtual model. As indicated at 318, the second position of the virtual model may be determined based upon the location the user is viewing. For example, the virtual model may be centered at the location the user is viewing and scaled to a life-sized view to provide the immersive first-person perspective and bring the user into the model. Further, as indicated at 320, the HMD device may display an animation representing the movement and/or scaling.

As indicated at 322, the movement and/or scaling (e.g., as presented via the above-described animation) may occur at a variable rate progression. As described above, as the scale changes, relative changes in scale that occur at a same rate may actually appear to occur at different rates. Thus, by performing the simultaneous movement and scaling at a variable rate progression, the rate can be adjusted to make the transition appear to occur at a consistent rate. Further, "slow takeoff" and "slow landing" effects, or other rate changes at either end of the transition, may be used to make the beginning and end of the transition between views appear to occur smoothly. Any suitable rate adjustment may be applied. As one non-limiting example, an exponential rate of scaling change may be used.

Any suitable transition may be performed. For example, as indicated at 324, the scaling may be performed to increase a size of the virtual model from a smaller size to a larger size. Further, as indicated at 326, the movement may be configured to move the virtual model from an overhead view of the model to a first person view within the model. The model may be transitioned from an immersive first person view to an overhead view using an inverse of the above-described rate progression to ease the user out of the immersive first-person viewpoint.

Although described herein as presenting a virtual reality view of the virtual model (e.g., in which the environment of the user is completely obscured by the model), the presentation of the scaled model in the second position also may be provided in an augmented reality environment, in which the scaled and moved model is viewable within the real-world environment of the user.

Figure 4:
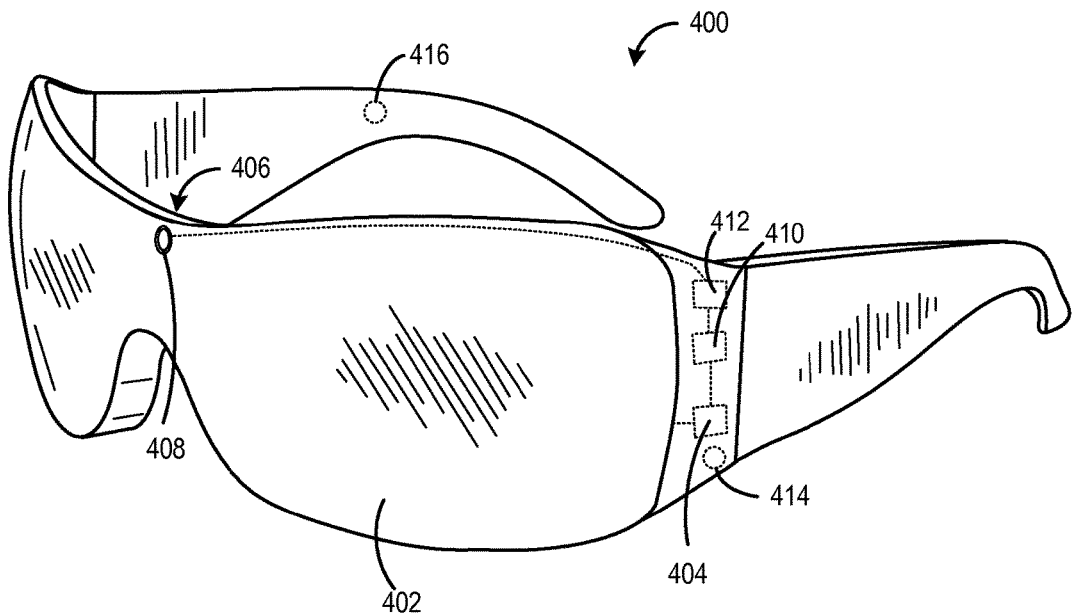
FIG. 4 shows an example head-mounted display device.

FIG. 4 illustrates an example HMD device 400. HMD device 400 may be an example of HMD device 104 of FIGS. 1-2C and/or may execute one or more of the operations of method 300 of FIG. 3. In this example, the illustrated HMD device 400 takes the form of wearable glasses or goggles, but it will be appreciated that other forms are possible. The HMD device 400 includes a see-through display 402 that may be configured to visually augment a view of a real world background environment by the user through the display. For example, the real-world background environment may be at least partially viewable through the see-through display 402.

As an example, the HMD device 400 may include an image production system 404 that is configured to display virtual objects such as holograms to the user with the see-through display 402. The holograms may be visually superimposed onto the physical environment so as to be perceived at various depths and locations. The HMD device 400 may use stereoscopy to visually place a virtual object at a desired depth by displaying different images of the virtual object to each of the user's eyes.

To achieve the perception of depth, the image production system 404 of the HMD device 400 may render the two images of the virtual object at a rendering focal plane of the HMD device 400, such that there is a binocular disparity between the relative positions of the virtual object in the two images. For example, such binocular disparity may be a horizontal disparity where the relative positions of the virtual object in the two images are separated by a distance in the x axis direction. In this embodiment, the x axis may be defined as the axis extending horizontally to the left and the right relative to the user, the y axis extending upward and downward vertically relative to the user, and the z axis extending forward and backward relative to the user, and orthogonally to the x and y axes.

The horizontal disparity between the relative positions of the virtual object in the two images will cause the user to perceive that the virtual object is located at a certain depth within the viewed physical environment due to stereopsis. Using this stereoscopy technique, the HMD device 400 may control the displayed images of the virtual objects, such that the user may perceive that the virtual objects exist at a desired depth and location in the viewed real world three dimensional environment.

In other examples, the see-through display 402 and image production system 404 may utilize other image display technologies and configurations. For example, the display 402 may include image-producing elements located within lenses (such as a see-through Organic Light-Emitting Diode (OLED) display). As another example, the display 402 may include a light modulator on an edge of the lenses. In this example, the lenses may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating an augmented reality environment.

The HMD device 400 further includes an optical sensor system 406 having one or more optical sensors. In one example, the optical sensor system 406 may include an outward facing optical sensor 408 configured to image the real world environment from a similar vantage point (e.g., line of sight) as observed by the user through the see-through display 402. The optical sensor system 406 may include any suitable optical sensor, such as a depth camera and/or an RGB (color image) camera.

The HMD device 400 may further include a position sensor system 410 with one or more position sensors such as accelerometer(s), gyroscope(s), magnetometer(s), global positioning system(s), multilateration tracker(s), and/or other sensors that output position sensor information useable as a position, orientation, and/or movement of the relevant sensor.

Optical sensor information received from the optical sensor system 406 and/or position sensor information received from position sensor system 410 may be used to assess a position and orientation of the vantage point of the see-through display 402 relative to other environmental objects. In some embodiments, the position and orientation of the vantage point may be characterized with six degrees of freedom (e.g., world-space X, Y, Z, pitch, roll, and yaw). The vantage point may be characterized globally or independently of the real world background. The position and/or orientation may be determined with an on-board computing system (e.g., on-board computing system 412) and/or an off-board computing system.

The optical sensor information and the position sensor information may be used by a computing system to perform analysis of the real world three dimensional environment, such as depth analysis, surface reconstruction, environmental color and lighting analysis, and/or other suitable operations. The optical and positional sensor information may be used to create a virtual simulation of the real world three dimensional environment. In some examples, the virtual simulation may comprise a three dimensional coordinate space that is overlaid upon the real world three dimensional environment. Also, in some examples, such sensor information may be provided to another computing device, such as a server, that creates the virtual simulation of the real world three dimensional environment.

In some examples, the position and orientation of the vantage point may be characterized relative to this virtual simulation. Moreover, the virtual simulation may be used to determine positions at which to display holograms and other virtual objects, and to add additional holograms to be displayed to the user at a desired depth and location within the virtual world.

The HMD device 400 may also include one or more microphones, such as microphone 414, that capture audio data. In other examples, audio may be presented to the wearer via one or more speakers, such as speaker 416 on the HMD device 400.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
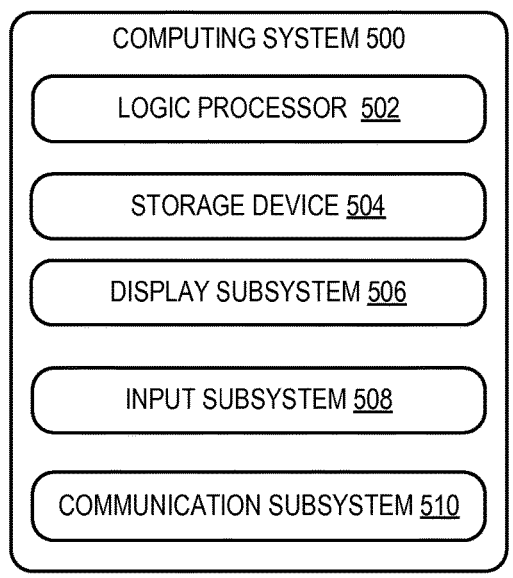
FIG. 5 shows a block diagram of an example computing device.

FIG. 5 schematically shows a non-limiting embodiment of a computing system 500 that can enact one or more of the methods and processes described above. Computing system 500 is shown in simplified form. Computing system 500 may take the form of one or more wearable devices (e.g., head-mounted display devices, such as HMD device 104 of FIGS. 1-2C and/or HMD device 400 of FIG. 4), personal computers, server computers, tablet computers, home-entertainment computers, network computing devices, gaming devices, mobile computing devices, mobile communication devices (e.g., smart phone), and/or other computing devices.

Computing system 500 includes a logic device 502 and a storage device 504. Computing system 500 may optionally include a display subsystem 506, input subsystem 508, communication subsystem 510, and/or other components not shown in FIG. 5.

Logic device 502 includes one or more physical devices configured to execute instructions. For example, the logic device may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing. Aspects of the logic device may be virtualized and executed by remotely accessible, networked computing devices configured in a cloud-computing configuration.

Storage device 504 includes one or more physical devices configured to hold instructions executable by the logic device to implement the methods and processes described herein. When such methods and processes are implemented, the state of storage device 504 may be transformed—e.g., to hold different data.

Storage device 504 may include removable and/or built-in devices. Storage device 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device 504 may include volatile, nonvolatile, dynamic, static, read/write, read-only, random-access, sequential-access, location-addressable, file-addressable, and/or content-addressable devices.

It will be appreciated that storage device 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic device 502 and storage device 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 506 may be used to present a visual representation of data held by storage device 504. This visual representation may take the form of a graphical user interface (GUI). As the herein described methods and processes change the data held by the storage device, and thus transform the state of the storage device, the state of display subsystem 506 may likewise be transformed to visually represent changes in the underlying data. Display subsystem 506 may include one or more display devices utilizing virtually any type of technology. Such display devices may be combined with logic device 502 and/or storage device 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

Another example provides a method for operating a head-mounted display device including displaying a virtual model at a first position in a coordinate frame of the head-mounted display device, receiving sensor data from one or more sensors of the head-mounted display device, determining a line of sight of the user that intersects the virtual model to identify a location the user is viewing, and, responsive to a trigger, moving the virtual model to a second position in the coordinate frame of the head-mounted display device corresponding to the location the user is viewing and simultaneously scaling the virtual model. Moving the virtual model may additionally or alternatively comprise performing one or more of the scaling and the moving of the virtual model progressively non-linearly. Moving the virtual model may additionally or alternatively comprise dynamically adjusting the speed of the movement during the movement based on a distance of a displayed position of the virtual model from the second position. Determining a line of sight of the user that intersects the virtual model may additionally or alternatively comprise determining a ray along an eyeline of the user and determining where the ray intersects the virtual model. Scaling the virtual model may additionally or alternatively comprise scaling the virtual model from a smaller size to a larger size. Moving the virtual model to the second position may additionally or alternatively comprise moving from an overhead view of the model to a first person view within the model, and the location the user is viewing may additionally or alternatively be maintained within the line of sight of the user while scaling and moving the virtual model. Moving the virtual model to the second position may additionally or alternatively comprise moving a surface of the model to an estimated location of a foot of the wearer of the head-mounted display device. The method may additionally or alternatively further include determining the estimated location of the foot of the wearer based upon one or more of head pose data and user profile data. The method may additionally or alternatively further include adjusting one or more of a volume and a perceived location of audio associated with the virtual model that is output during moving of the virtual model. The method may additionally or alternatively further include fading out an appearance of the virtual model at the first position and fading in an appearance of the virtual model at the second position while moving the virtual model to the second position. The trigger may additionally or alternatively include a detected gesture. The trigger may additionally or alternatively include detection of an actuation of a physical input device in communication with the head-mounted display device. Any or all of the above-described examples may be combined in any suitable manner in various implementations.

Another example provides a head-mounted display device including a display, a logic device, and a storage device storing instructions executable by the logic device to display a virtual model at a first position in a coordinate frame of the head-mounted display device, and, responsive to a trigger, display an animation representing a movement of the virtual model from the first position to a second position in a coordinate frame of the head-mounted display device and simultaneously scale the virtual model based on the movement such that one or more of the movement and scaling occurs at a variable rate progression. The head-mounted display device may additionally or alternatively further include one or more sensors, wherein the instructions are further executable to receive sensor data from the one or more sensors, determine a head pose of a user based on the sensor data, and determine a line of sight of the user that intersects the virtual model to identify a location the user is viewing, the second position corresponding to the location the user is viewing. The instructions to scale the virtual model may additionally or alternatively comprise instructions executable to scale the virtual model from a smaller size to a larger size. The instructions executable to move the virtual model to the second position may additionally or alternatively comprise instructions executable to move from an overhead view of the model to a first person view within the model. The instructions executable to move the virtual model to the second position may additionally or alternatively comprise instructions executable to move a surface of the model to an estimated location of a foot of the wearer of the head-mounted display device. Any or all of the above-described examples may be combined in any suitable manner in various implementations.

Another example provides a head-mounted display device comprising a display, one or more sensors, a logic device, and a storage device storing instructions executable by the logic device to display a virtual model at a first position in a coordinate frame of the head-mounted display device, determine a head pose of the user based on sensor data acquired via the one or more sensors, determine a line of sight of the user that intersects the virtual model to identify a location the user is viewing, and responsive to a trigger, displaying, via the display, an animation representing a movement of the virtual model to a second position in the coordinate frame of the head-mounted display device and simultaneously scaling the virtual model based on the movement such that one or more of the movement and the scaling occurs at a variable rate progression, the second position corresponding to the location the user is viewing. Scaling the virtual model may additionally or alternatively comprise scaling the virtual model from a smaller size to a larger size and wherein moving the virtual model to the second position comprises moving from an overhead view of the model to a first person view within the model. Moving the virtual model to the second position may additionally or alternatively comprise moving a surface of the model to an estimated location of a foot of the wearer of the head-mounted display device. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for operating a head-mounted display device, the method comprising:

displaying via the head-mounted display device a virtual model at a first position in a coordinate frame of the head-mounted display device;

receiving sensor data from one or more sensors of the head-mounted display device;

determining a line of sight of a user that intersects the virtual model to identify a location the user is viewing; and responsive to a trigger, moving the virtual model to a second position in the coordinate frame of the head-mounted display device corresponding to the location the user is viewing and simultaneously scaling a size of the virtual model relative to a field of view of the head-mounted display device, and adjusting a speed of the movement and scaling by moving and scaling the virtual model more quickly while the virtual model is smaller relative to the field of view of the head-mounted display device and more slowly as the virtual model grows larger relative to the field of view of the head-mounted display device, such that the virtual model appears to move and scale in size at a consistent rate relative to the field of view of the head-mounted display device.

2. The method of claim 1, wherein moving the virtual model comprises performing one or more of the scaling and the moving of the virtual model progressively non-linearly.

3. The method of claim 1, where determining a line of sight of the user that intersects the virtual model comprises determining a ray along an eyeline of the user and determining where the ray intersects the virtual model.

4. The method of claim 1, wherein scaling the virtual model comprises scaling the virtual model from a smaller size to a larger size.

5. The method of claim 4, wherein moving the virtual model to the second position comprises moving from an overhead view of the model to a first person view within the model, and wherein the location the user is viewing is maintained within the line of sight of the user while scaling and moving the virtual model.

6. The method of claim 4, wherein moving the virtual model to the second position comprises moving a surface of the model to an estimated location of a foot of the wearer of the head-mounted display device.

7. The method of claim 6, further comprising determining the estimated location of the foot of the wearer based upon one or more of head pose data and user profile data.

8. The method of claim 1, further comprising adjusting one or more of a volume and a perceived location of audio associated with the virtual model that is output during moving of the virtual model.

9. The method of claim 1, further comprising fading out an appearance of the virtual model at the first position and fading in an appearance of the virtual model at the second position while moving the virtual model to the second position.

10. The method of claim 1, wherein the trigger includes a detected gesture.

11. The method of claim 1, wherein the trigger includes detection of an actuation of a physical input device in communication with the head-mounted display device.

12. A head-mounted display device, comprising:
a display;
a logic device; and
a storage device storing instructions executable by the logic device to
display via the display of the head-mounted display device a virtual model at a first position in a coordinate frame of the head-mounted display device; and
responsive to a trigger, display an animation representing a movement of the virtual model from the first position to a second position in the coordinate frame of the head-mounted display device and simultaneously scale a size of the virtual model relative to a field of view of the head-mounted display device based on the movement such that the movement and scaling occurs at a variable rate progression in which the virtual model moves and scales more quickly while the virtual model is smaller relative to the field of view of the head-mounted display device and more slowly as the virtual model grows larger relative to the field of view of the head-mounted display device, such that the virtual model appears to move and scale in size at a consistent rate relative to the field of view of the head-mounted display device.

13. The head-mounted display device of claim 12, further comprising one or more sensors, wherein the instructions are further executable to receive sensor data from the one or more sensors, determine a head pose of a user based on the sensor data, and determine a line of sight of the user that intersects the virtual model to identify a location the user is viewing, the second position corresponding to the location the user is viewing.

14. The head-mounted display device of claim 12, wherein the instructions to scale the virtual model comprise instructions executable to scale the virtual model from a smaller size to a larger size.

15. The head-mounted display device of claim 14, wherein the instructions executable to move the virtual model to the second position comprise instructions executable to move from an overhead view of the model to a first person view within the model.

16. The head-mounted display device of claim 14, wherein the instructions executable to move the virtual model to the second position comprise instructions executable to move a surface of the model to an estimated location of a foot of the wearer of the head-mounted display device.

17. A head-mounted display device comprising:
a display;
one or more sensors;
a logic device; and
a storage device storing instructions executable by the logic device to
display via the display of the head-mounted display device a virtual model at a first position in a coordinate frame of the head-mounted display device;
determine a head pose of a user based on sensor data acquired via the one or more sensors;
determine a line of sight of the user that intersects the virtual model to identify a location the user is viewing; and
responsive to a trigger, displaying, via the display, an animation representing a movement of the virtual model to a second position in the coordinate frame of the head-mounted display device, the second position corresponding to the location the user is viewing, and simultaneously scaling a size of the virtual model relative to a field of view of the head-mounted display device based on the movement such that the movement and the scaling occurs at a variable rate progression in which the virtual model moves and scales more quickly while the virtual model is smaller relative to the field of view of the head-mounted display device and more slowly as the virtual model grows larger relative to the field of view of the head-mounted display device, such that the virtual model appears to move and scale in size at a consistent rate relative to the field of view of the head-mounted display device.

18. The head-mounted display device of claim 17, wherein scaling the virtual model comprises scaling the virtual model from a smaller size to a larger size and wherein moving the virtual model to the second position comprises moving from an overhead view of the model to a first person view within the model.

19. The head-mounted display device of claim 17, wherein moving the virtual model to the second position comprises moving a surface of the model to an estimated location of a foot of the wearer of the head-mounted display device.

* * * * *